(12) United States Patent
Vaystikh et al.

(10) Patent No.: US 10,592,978 B1
(45) Date of Patent: Mar. 17, 2020

(54) METHODS AND APPARATUS FOR RISK-BASED AUTHENTICATION BETWEEN TWO SERVERS ON BEHALF OF A USER

(75) Inventors: Alex Vaystikh, Hod Hasharon (IL); Alon Kaufman, Bnei-Dror (IL); Yael Villa, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/537,525

(22) Filed: Jun. 29, 2012

(51) Int. Cl.
*G06Q 40/00* (2012.01)

(52) U.S. Cl.
CPC .................... *G06Q 40/00* (2013.01)

(58) Field of Classification Search
CPC ...... G06F 21/316; G06F 21/50; G06F 21/577; G06F 21/57; G06Q 10/0635; G06Q 20/4016; H04L 63/10; H04L 63/0807
See application file for complete search history.

(56) References Cited

U.S. PATENT DOCUMENTS

| | | | |
|---|---|---|---|
| 6,253,202 B1 * | 6/2001 | Gilmour | G06F 17/3061 |
| 6,330,546 B1 * | 12/2001 | Gopinathan et al. | 705/35 |
| 7,076,558 B1 * | 7/2006 | Dunn | G06F 21/6218 709/225 |
| 7,433,855 B2 * | 10/2008 | Gavan et al. | 706/47 |
| 7,610,390 B2 * | 10/2009 | Yared et al. | 709/229 |
| 7,831,522 B1 * | 11/2010 | Satish | G06Q 20/02 705/76 |
| 7,874,000 B1 * | 1/2011 | Lal | 726/23 |
| 7,908,644 B2 * | 3/2011 | Roskind et al. | 726/3 |
| 8,019,678 B2 * | 9/2011 | Wright et al. | 705/38 |
| 8,020,763 B1 * | 9/2011 | Kowalchyk et al. | 235/380 |
| 8,132,242 B1 * | 3/2012 | Wu | H04L 9/06 713/168 |
| 8,387,108 B1 * | 2/2013 | Satish et al. | 726/1 |
| 8,499,355 B1 * | 7/2013 | Goncharov | 726/25 |
| 8,595,494 B2 * | 11/2013 | Monjas Llorente | G06F 21/335 713/159 |

(Continued)

OTHER PUBLICATIONS

OAuth Core Workgroup, OAuth Core 1.0 Revision A, available at http://oauth.net/core/1.0a (last checked May 1, 2013).*

(Continued)

*Primary Examiner* — Sharon S Lynch
(74) *Attorney, Agent, or Firm* — Ryan, Mason & Lewis, LLP (57) ABSTRACT

Methods and apparatus are provided for risk-based authentication between two servers on behalf of a user. A method is provided for controlling access by a consumer to a service provider on behalf of a user. An authentication request is issued responsive to an initial access request from the consumer to access the service provider on behalf of the user. An access token is provided to the consumer upon approval from the user to grant access to the consumer. Upon receiving a subsequent access request from the consumer with the access token to access the service provider on behalf of the user; a risk analysis is performed to determine if the subsequent access request should be granted. The risk analysis can determine if the subsequent access complies with one or more rules of the user. The user is optionally prompted to specify whether to allow the subsequent access request and/or future similar transactions.

20 Claims, 7 Drawing Sheets

(56) References Cited

U.S. PATENT DOCUMENTS

| | | | | |
|---|---|---|---|---|
| 8,635,701 B2* | 1/2014 | Hilaiel et al. | | 726/25 |
| 8,656,465 B1* | 2/2014 | Fong-Jones | | 726/5 |
| 8,776,168 B1* | 7/2014 | Gibson et al. | | 726/1 |
| 8,819,803 B1* | 8/2014 | Richards | H04L 9/3213 | 726/9 |
| 8,959,650 B1* | 2/2015 | Richards | G06F 21/335 | 709/227 |
| 9,792,425 B2* | 10/2017 | Stone | H04L 9/3234 | |
| 2002/0046352 A1* | 4/2002 | Ludwig | H04L 63/0823 | 726/12 |
| 2003/0037251 A1* | 2/2003 | Frieder et al. | | 713/200 |
| 2003/0084300 A1* | 5/2003 | Koike | H04L 63/0428 | 713/182 |
| 2005/0203881 A1* | 9/2005 | Sakamoto et al. | | 707/3 |
| 2006/0259950 A1* | 11/2006 | Mattsson | | 726/1 |
| 2006/0282660 A1* | 12/2006 | Varghese | G06F 21/31 | 713/155 |
| 2006/0294196 A1* | 12/2006 | Feirouz | G06F 17/30899 | 709/217 |
| 2007/0106582 A1* | 5/2007 | Baker et al. | | 705/35 |
| 2007/0136573 A1* | 6/2007 | Steinberg | G06F 21/32 | 713/155 |
| 2007/0226783 A1* | 9/2007 | Mimlitsch | | 726/4 |
| 2008/0154770 A1* | 6/2008 | Rutherford et al. | | 705/44 |
| 2009/0031426 A1* | 1/2009 | Dal Lago et al. | | 726/26 |
| 2009/0089869 A1* | 4/2009 | Varghese | | 726/7 |
| 2009/0222925 A1* | 9/2009 | Hilaiel et al. | | 726/25 |
| 2009/0327107 A1* | 12/2009 | Lal | G06Q 20/24 | 705/30 |
| 2010/0121916 A1* | 5/2010 | Lin | | 709/203 |
| 2010/0269175 A1* | 10/2010 | Stolfo et al. | | 726/22 |
| 2011/0010762 A1* | 1/2011 | Nijdam et al. | | 726/5 |
| 2011/0029902 A1* | 2/2011 | Bailey | | 715/764 |
| 2011/0196791 A1* | 8/2011 | Dominguez | G06Q 40/00 | 705/44 |
| 2011/0225625 A1* | 9/2011 | Wolfson et al. | | 726/1 |
| 2011/0307957 A1* | 12/2011 | Barcelo et al. | | 726/25 |
| 2012/0060207 A1* | 3/2012 | Mardikar et al. | | 726/4 |
| 2012/0191596 A1* | 7/2012 | Kremen | G06Q 40/02 | 705/38 |
| 2012/0204221 A1* | 8/2012 | Monjas Llorente et al. | | 726/1 |
| 2012/0317624 A1* | 12/2012 | Monjas Llorente et al. | | 726/4 |
| 2012/0317638 A1* | 12/2012 | Carrara et al. | | 726/17 |
| 2012/0323717 A1* | 12/2012 | Kirsch | | 705/26.1 |
| 2013/0036455 A1* | 2/2013 | Bodi et al. | | 726/4 |
| 2013/0040729 A1* | 2/2013 | Griffin | G06Q 30/00 | 463/25 |
| 2013/0086657 A1* | 4/2013 | Srinivasan et al. | | 726/6 |
| 2013/0139238 A1* | 5/2013 | Ryan | | 726/7 |
| 2013/0173712 A1* | 7/2013 | Monjas Llorente et al. | | 709/204 |
| 2013/0227712 A1* | 8/2013 | Salem et al. | | 726/30 |
| 2013/0276125 A1* | 10/2013 | Bailey | | 726/25 |
| 2013/0283356 A1* | 10/2013 | Mardikar et al. | | 726/4 |
| 2014/0068746 A1* | 3/2014 | Gonzalez Martinez et al. | | 726/9 |
| 2014/0189808 A1* | 7/2014 | Mahaffey | H04L 63/0853 | 726/4 |
| 2016/0078214 A1* | 3/2016 | Angal | G06F 21/44 | 726/4 |

OTHER PUBLICATIONS

Eran Hammer, Beginner's Guide to OAuth—Part II: Protocol Workflow, Hueniverse (Oct. 15, 2007) (available at http://hueniverse.com/2007/10/beginners-guide-to-oauth-part-ii-protocol-workflow/) (last checked May 1, 2013).*

ClientLogin for Installed Applications, Google Accounts Authentication and Authorization, Google Developers, available at http://code.google.com/apis/accounts/docs/AuthForInstalledApps.html) (last visited May 1, 2013).*

* cited by examiner

METHODS AND APPARATUS FOR RISK-BASED AUTHENTICATION BETWEEN TWO SERVERS ON BEHALF OF A USER

FIELD OF THE INVENTION

The present invention relates generally to security techniques for authentication on behalf of a user over a network or in other types of communication systems.

BACKGROUND OF THE INVENTION

In order to gain access to applications or other resources via a computer or other user device, users are often required to authenticate themselves by entering authentication information. Such authentication information may comprise, for example, usernames and passwords. Users often have multiple usernames and passwords that may be used to access a plurality of websites. A user might have one username/password combination for a first class of websites that store sensitive information, such as financial websites, and a second username/password combination for a second class of websites, such as social networking sites. It is often challenging for a user to remember each username/password combination.

Single sign-on (SSO) solutions, such as OpenID, have been proposed. Single sign-on (SSO) solutions provide access control for multiple systems, allowing a user to log in once and obtain access to all systems without being prompted again to log in at each system. Similarly, OAuth is an open standard for authorization. OAuth allows users to share private resources, such as photos and contact lists, stored on a first site (often referred to as a "Service Provider") with another site (often referred to as a "Consumer") without having to provide their credentials. OAuth is used when a user wants a Consumer to retrieve data from a Service Provider securely, on his or her behalf.

Under OAuth, once a relationship is established between a Consumer and a Service Provider, the communication often happens directly between the two, without involving the user. Typically, the Consumer is provided with the username of the user and password tokens. Each token grants access to the Consumer for specified resources (e.g., access to a given album). In this manner, the user can grant the Consumer access to their information stored with the Service Provider, without sharing their access permissions or the full extent of their data.

When both the Service Provider and the Consumer support OAuth, the user mediates and approves the Consumer to access the information from the Service Provider. This often happens when the Consumer redirects the User to the Service Provider's authorization page. On the authorization page, the user can either accept or reject the requested permissions, which are often vague and very broad, leaving a potential for abuse by the Consumer.

Thus, improved security techniques are needed to reduce the susceptibility of the user to such abuse by the Consumer.

SUMMARY OF THE INVENTION

The present invention in the illustrative embodiments described herein provides methods and apparatus for risk-based authentication between two servers on behalf of a user. In accordance with an aspect of the invention, a method is provided for controlling access by a consumer to a service provider on behalf of a user. The method comprises the steps of: issuing an authentication request responsive to an initial access request from the consumer to access the service provider on behalf of the user; providing an access token to the consumer upon approval from the user to grant access to the consumer; receiving a subsequent access request from the consumer with the access token to access the service provider on behalf of the user; and performing a risk analysis to determine if the subsequent access request should be granted.

In one exemplary embodiment, the risk analysis determines if the subsequent access complies with one or more rules of the user. For example, the risk analysis can determine if the subsequent access demonstrates one or more of abnormal, risky and atypical behavior relative to prior transactions of the consumer and one or more rules of the user.

The user is optionally prompted to specify whether to allow the subsequent access request and/or future transactions that are similar to the subsequent access request.

The authentication techniques of the illustrative embodiments overcome one or more of the problems associated with the conventional techniques described previously, and provide improved security by prompting users to specify whether to allow or decline a current transaction and similar future transactions. Moreover, no modification of the applications or communication protocols is required. These and other features and advantages of the present invention will become more readily apparent from the accompanying drawings and the following detailed description.

DETAILED DESCRIPTION

The present invention provides methods and apparatus for risk-based authentication between two servers (a Service Provider and a Consumer) on behalf of a user. According to one aspect of the invention, abnormal, risky and/or atypical access patterns from a Consumer to a Service-Provider on behalf of a given user are detected. Upon detecting such an abnormal, risky and/or atypical access attempt, the user is prompted to specify whether to allow or decline a current transaction and similar future transactions. In this manner, the typical access patterns can be learned, hence reducing the amount of alerts and help guide the user for improved security and usability.

The present invention will be described herein with reference to an exemplary communication system in which a user device communicates with an authentication manager and one or more additional entities, such as a Consumer and a Service Provider. It is to be appreciated, however, that the invention is not restricted to use in this or any other particular system configuration.

Figure 1:
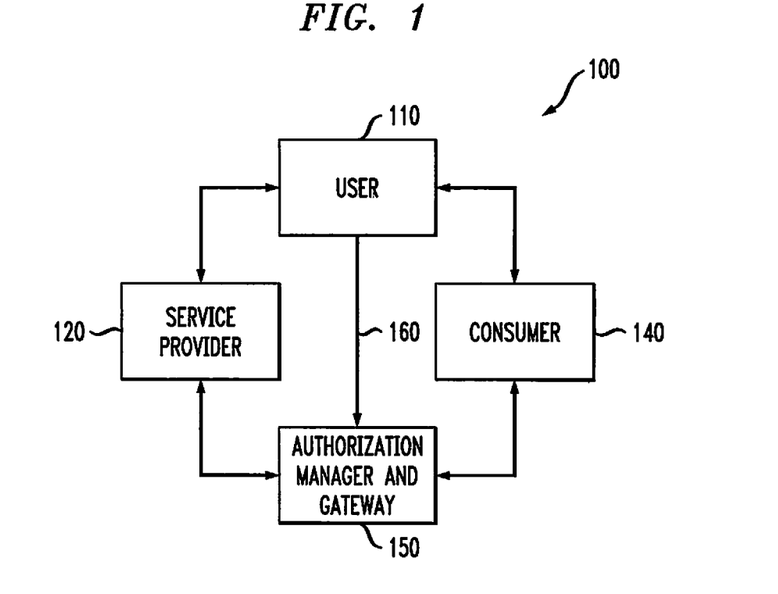
FIG. 1 illustrates an exemplary network environment in which the present invention can operate.

FIG. 1 illustrates an exemplary user 110 using a client-side computing device (not shown) communicating with a service provider 120 and a consumer 140 over a network 160. In an exemplary implementation, the user must authenticate with an authentication manager and gateway 150, for example, using a token. The network 160, may comprise, for example, a global computer network such as the Internet, a wide area network (WAN), a local area network (LAN), a satellite network, a telephone or cable network, or various portions or combinations of these and other types of networks.

The service provider 120 and consumer 140 communicate with one another on behalf of the user, for example, in accordance with OAuth or another server-to-server protocol.

As discussed hereinafter, the authentication manager and gateway 150 allows the user 110 to specify rules that define the permissions of the consumer 140. For example, the rules can specify the types of documents that the consumer 140 can and cannot access on behalf of the user, and whether the consumer 140 can write or delete any documents. In addition, the user can optionally inherit default rules, for example, from enterprise rules, that further restrict access to documents.

Once approved by the user 110, the authentication manager and gateway 150 will monitor the activity between the service provider 120 and consumer 140. If the consumer 140 attempts to perform an action that is not permitted under the rules but looks risky, such as accessing a document in another folder which it never accessed before, the authentication manager and gateway 150 will stop this action and issue a prompt to the user. For example, the user 110 might receive an email with a link to his or her management dashboard, or an alert on his or her Smartphone, where at any later time the user 110 can resolve the issue and teach the authentication manager and gateway 150 accordingly. If a user 110 has multiple consumers 140, as is common for service providers 120 that store a lot of information, the user 110 will be able to manage them individually, see their access-patterns and update their permissions accordingly.

The exemplary communications among the system elements 110, 120, 140, 150 of FIG. 1 to achieve risk-based authentication of a consumer 140 allegedly acting on behalf of a user 110 is discussed further below in conjunction with FIGS. 2 through 4.

It is to be appreciated that a given embodiment of the disclosed system may include multiple instances of user 110, service provider 120, consumer 140 and authentication manager and gateway 150, and possibly other system components, although only single instances of such components are shown in the simplified system diagram of FIG. 1 for clarity of illustration.

A security token may be implemented, for example, using the RSA SecurID® user authentication token commercially available from RSA Security Inc. of Bedford, Mass., U.S.A. The security token may be a server or other type of module that is accessible over the network 160, or it may be a software component resident on the device of the user 110. As another alternative, the token may be distributed over multiple devices, one of which may be the device of the user 110. In addition, for a detailed discussion of a modular and/or component implementation of a token-based authentication technique, see, for example, U.S. Pat. No. 7,562,221 to Nystrom et al., assigned to the assignee of the present invention and incorporated by reference herein The device of the user 110 may represent a portable device, such as a mobile telephone, personal digital assistant (PDA), wireless email device, game console, etc. The device of the user 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The device of the user 110 may also be referred to herein as simply a "user" or a "client." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a device of the user 110, a person utilizing or otherwise associated with the device, or a combination of both the person and the device.

The authentication manager and gateway 150 is typically a third party entity that processes authentication requests on behalf of web servers and other resources, and verifies the authentication information that is presented by a device of the user 110 or the consumer 140.

Figure 2:
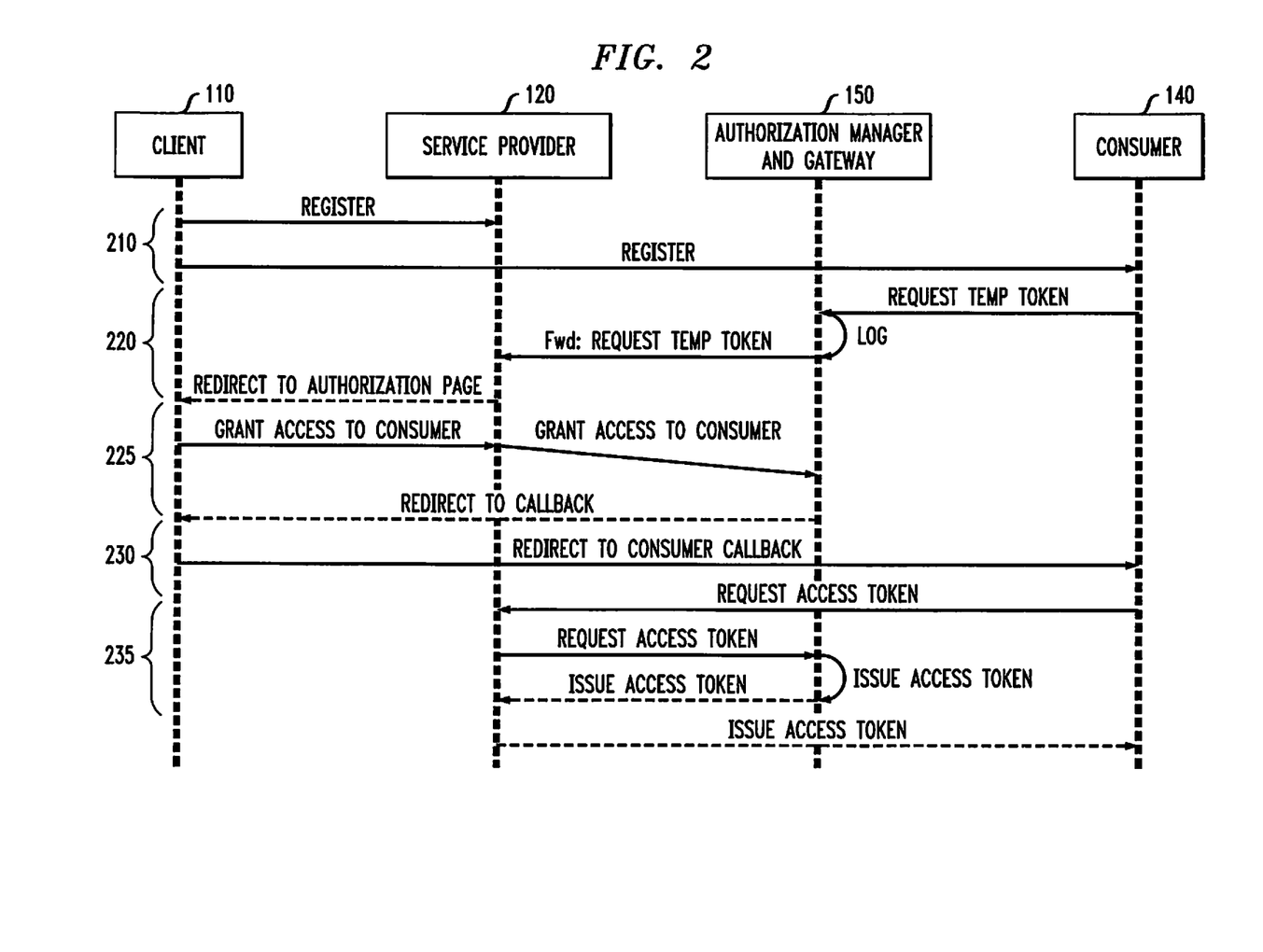
FIG. 2 illustrates an exemplary conventional authentication process.

FIG. 2 illustrates communications among various system elements 110, 120, 140, 150 of FIG. 1 at particular points in time for an exemplary conventional authentication process. For a more detailed discussion of suitable single-sign on authentication techniques, see, for example, U.S. Pat. No. 7,562,221 to Nystrom et al., assigned to the assignee of the present invention and incorporated by reference herein.

As shown in FIG. 2, at time 210, the client 110 requests access to both the service provider 120 and consumer 140. The client 110 registers with the service provider 120 and requests the consumer 140 to connect to the service provider 120 on behalf of the client 110.

At time 220, the consumer 140 requests a temporary token from the authentication manager and gateway 150, where the request is logged and forwarded to the service provider 120 for a temporary token. The request redirects the client 110 to the authorization page for the client 110 to accept or deny the request by the consumer 140 to access the service provider 120 on behalf of the client 110. If the client 110 grants access to the consumer 140, at time 225, it is communicated to the service provider 120 and then to the authentication manager and gateway 150.

At time 230, the authentication manager and gateway 150 issues a callback to the client 110, which redirects the client 110 to the consumer 140. At time 235, the consumer 140 requests an access token from the service provider 120 which is validated by the authentication manager and gateway 150. Once validated, the authentication manager and gateway 150 instructs the service provider 120 to issue the access token, which is then sent to the consumer 140. Generally, once the consumer 140 is approved, the consumer 140 can access the service provider 120 on behalf of the client 110 until the authorization is revoked by the client 110.

Figure 3A:
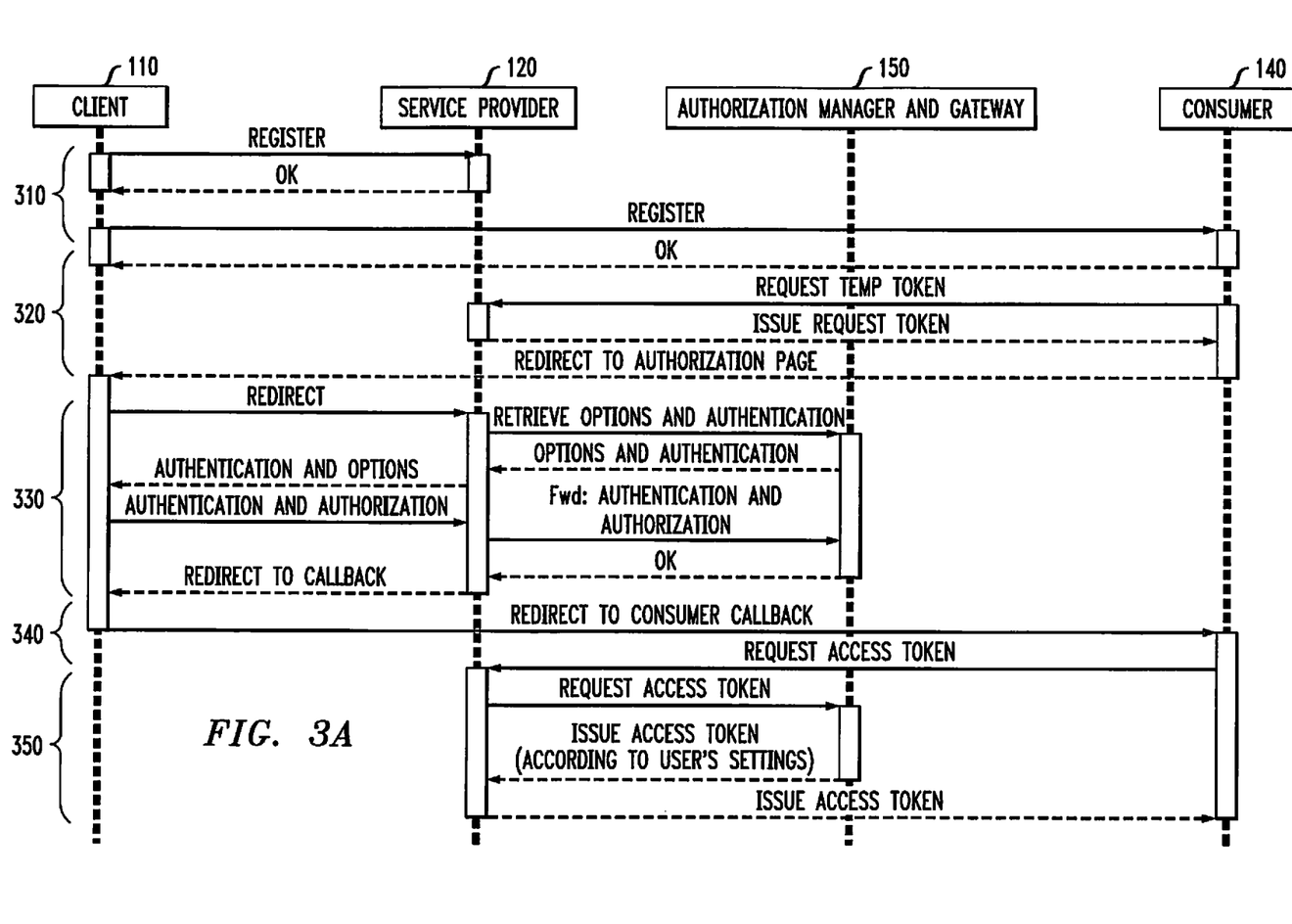
FIGS. 3 and 4 illustrate exemplary authentication processes incorporating features of the present invention.
Figure 3B:
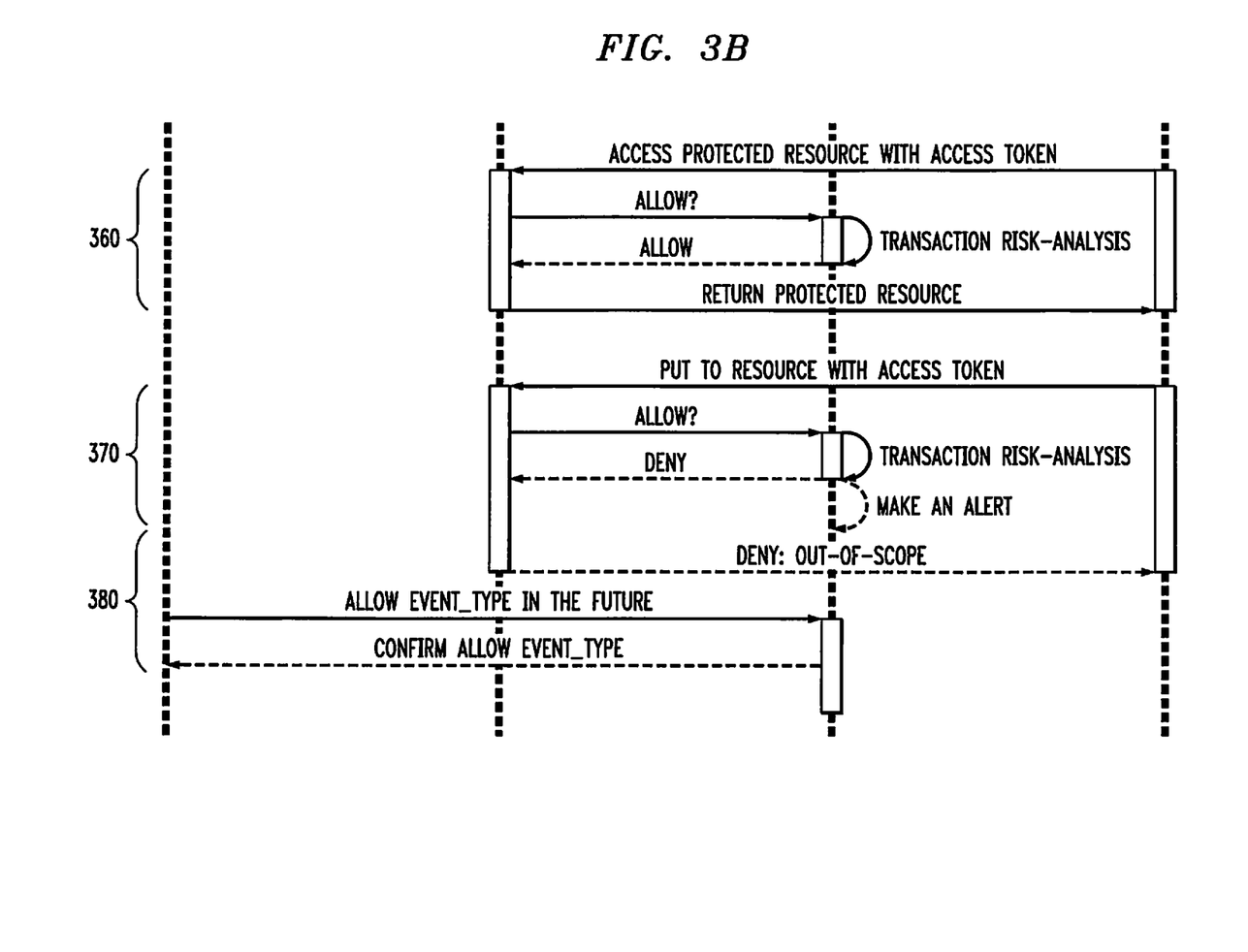

FIGS. 3A and 3B, collectively, illustrate communications among the various system elements 110, 120, 140, 150 of FIG. 1 at particular points in time, for an exemplary risk-based authentication process that incorporates aspects of the present invention. Times 310 and 320 of FIG. 3 proceed generally in the same manner as corresponding times 210 and 220 of FIG. 2. At time 330, the client 110 is redirected to the service provider 120, and the service provider 120 communicates with the authentication manager and gateway 150 to retrieve options and authentication, which are then sent to the client 110. Once the client authorizes the consumer 140 to access the service provider 120 on behalf of the client 110, this authorization is sent to the service provider 120, which is then communicated to the authentication manager and gateway 150.

At time 340, the service provider 120 issues a callback to the client 110, which redirects the client 110 to the consumer 140. At time 350, the consumer 140 requests an access token from the service provider 120 which is validated by the authentication manager and gateway 150. If the access token request is validated at time 350, the authentication manager and gateway 150 instructs the service provider 120 to issue the access token, which is then sent to the consumer 140.

If, however, the consumer 140 subsequently attempts to access the service provider 120 using the token at time 360, the authentication manager and gateway 150 performs a risk analysis to determine whether to allow the request. If the risk analysis results in an authorization at time 360, the authentication manager and gateway 150 instructs the service provider 120 to allow the access, and the service provider 120 sends the consumer 140 a protected resource.

If, however, the risk analysis results in a denial at time 370, the authentication manager and gateway 150 instructs the service provider 120 to deny the access as out of scope and makes an alert to the user. At time 380, the client 110 instructs the authentication manager and gateway 150 to allow or deny similar requests in the future.

Figure 4A:
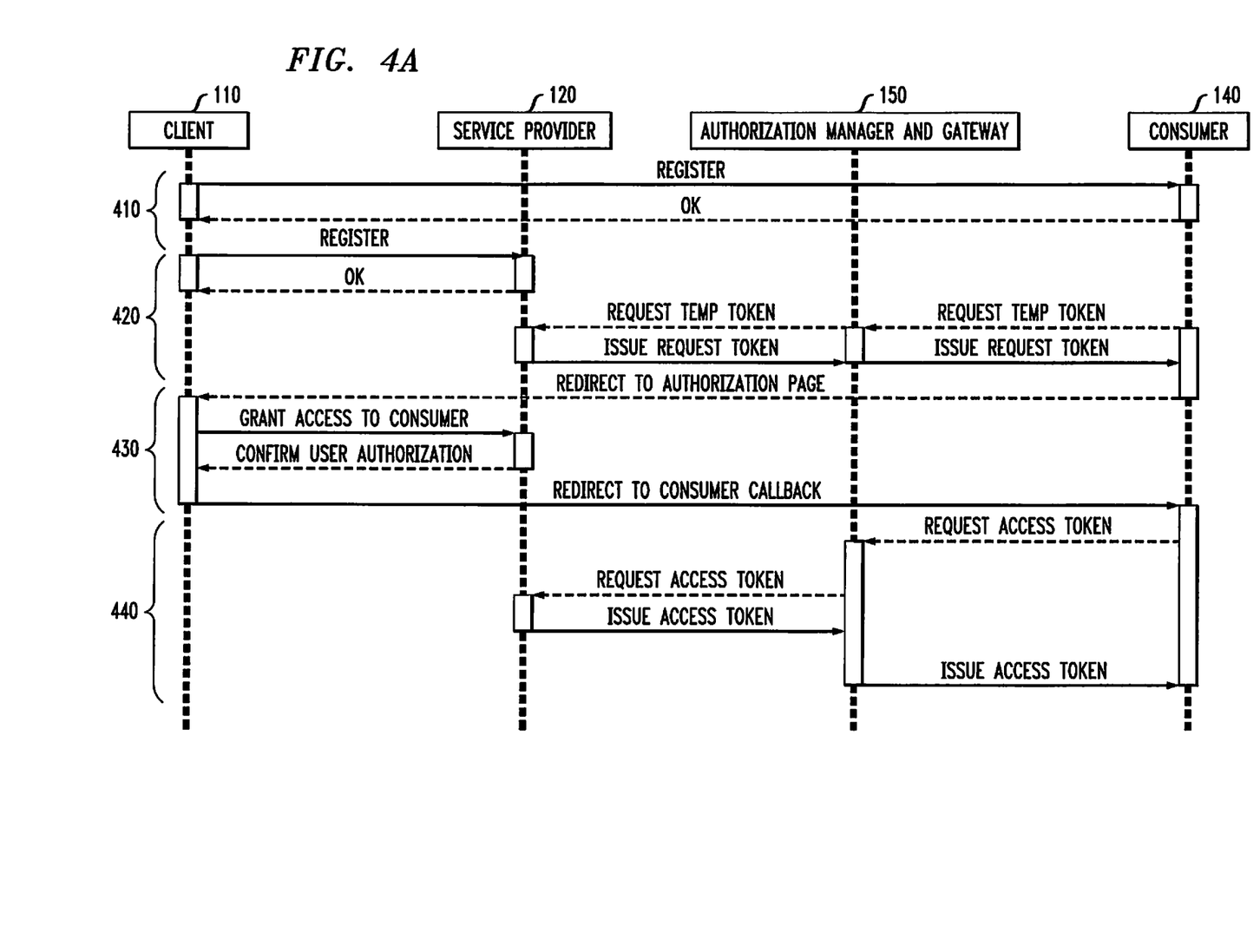
Figure 4B:
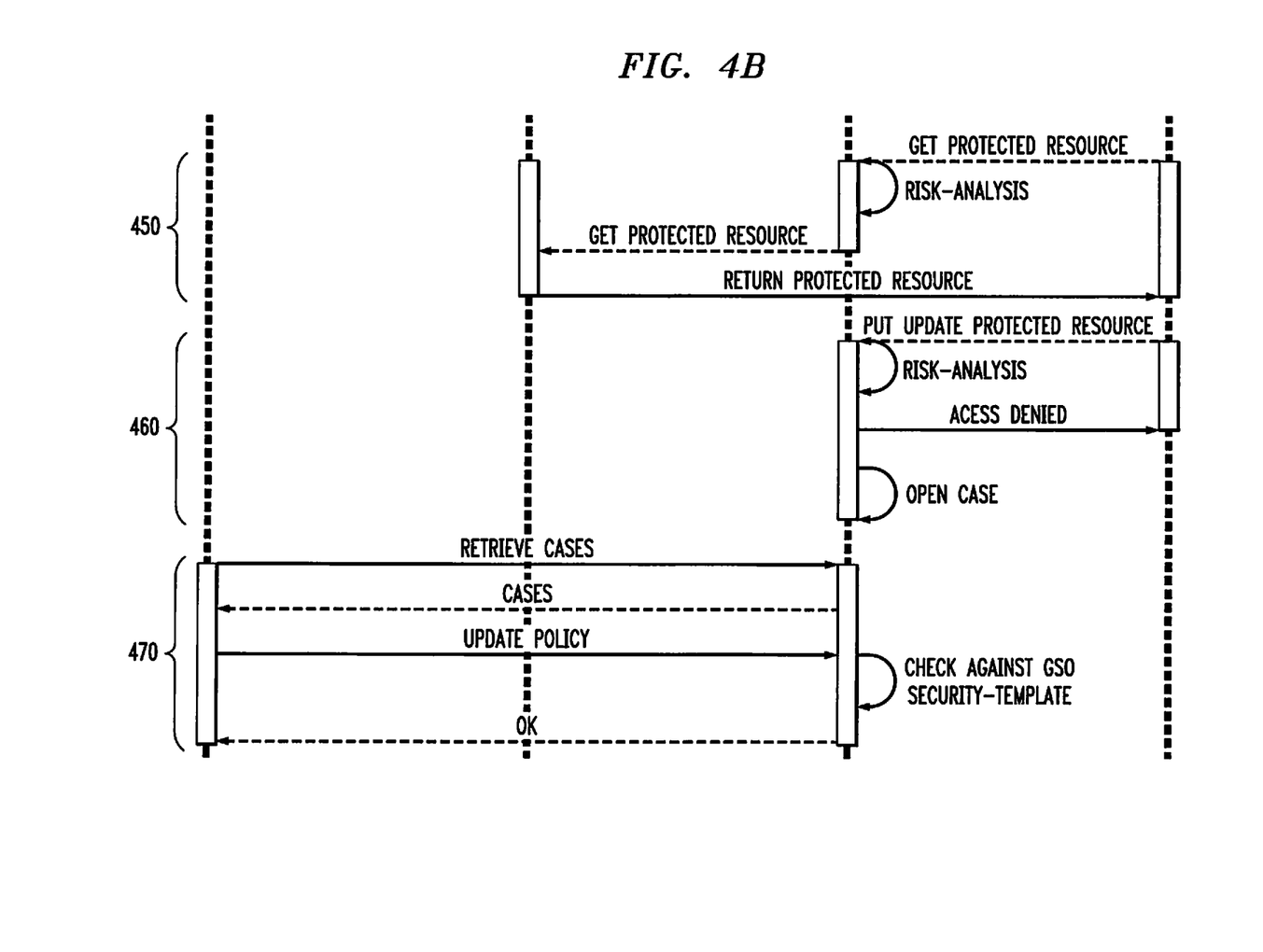

FIGS. 4A and 4B, collectively, illustrate communications among the various system elements 110, 120, 140, 150 of FIG. 1 at particular points in time, for an exemplary risk-based authentication process that incorporates aspects of the present invention. Times 410, 420 and 430 of FIG. 4 proceed generally in the same manner as corresponding times 210, 220 and 225, respectively of FIG. 2.

At time 440, the consumer 140 requests an access token from the authentication manager and gateway 150 which is then forwarded to the service provider 120. If the service provider 120 issues an access token, it is forwarded to the authentication manager and gateway 150 and then the consumer 140.

At time 450, the consumer 140 attempts to access a protected resource by contacting the authentication manager and gateway 150. The authentication manager and gateway 150 performs a risk analysis in accordance with the present invention and if authorized, forwards the request to access a protected resource to the service provider 120. The service provider 120 returns a protected resource to the consumer 140.

At time 460, the consumer 140 again attempts to access a protected resource on the service provider 120 by contacting the authentication manager and gateway 150. The authentication manager and gateway 150 performs a risk analysis in accordance with the present invention and if denied, sends a denial notification to the consumer 140 and opens a case file for further investigation and action by the client 110.

At time 470, the client 110 retrieves the case file and updates the policies and rules with the authentication manager and gateway 150 for the consumer 140 accordingly. The authentication manager and gateway 150 validates the updated policies and rules and confirms them with the client 110.

Figure 5:
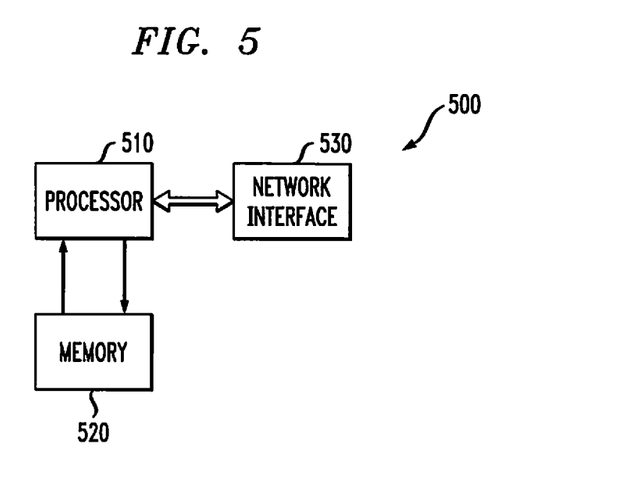
FIG. 5 illustrates one possible implementation of a computing device in the exemplary network environment of FIG. 1.

FIG. 5 shows one possible implementation of a given processing device 500 of the FIG. 1 system. The processing device 500 as shown may be viewed as representing, for example, a device of the user 110, service provider 120, consumer 140 and authentication manager and gateway 150. The processing device 500 in this implementation includes a processor 510 coupled to a memory 520 and a network interface 530. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 520 and executed by the corresponding processor 510. The memory 520 is also used for storing information used to perform computations or other operations associated with the disclosed authentication on techniques.

As mentioned previously herein, the above-described embodiments of the invention are presented by way of illustrative example only. Numerous variations and other alternative embodiments may be used.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide an improved authentication of users of password-based authentication systems. In particular, aspects of the present invention provide improved security by performing a risk analysis when an anomalous access request is attempted by a consumer 140. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of time-varying credentials or authentication information, rather than just token codes, and other types of access-controlled resources. Also, the particular configuration of system elements shown in FIGS. 1 and 5, and their interactions as shown in FIGS. 2 through 4, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for controlling access by a consumer to a service provider on behalf of a user, the method comprising the steps of:

obtaining by an authentication manager and gateway one or more rules from said user specifying one or more permissions of the consumer;

issuing an authentication request responsive to an initial access request from the consumer to access the service provider on behalf of the user in accordance with a server-to-server protocol;

providing an access token to the consumer upon approval from the user to grant access to the consumer on behalf of said user, wherein said access token authorizes the consumer to act on behalf of said user until said access token is revoked;

enabling said consumer to use said access token for initial access to the service provider on behalf of the user;

receiving, using at least one processing device of the authentication manager and gateway, a subsequent access request from the consumer with said access token to access the service provider on behalf of the user, wherein the subsequent access request is subsequent to said initial access to the service provider;

performing a risk analysis, using at least one processing device of the authentication manager and gateway, in response to receiving from said consumer said subsequent access request with said access token authorizing the consumer to act on behalf of said user when said access token has not been revoked, to improve security by detecting an anomalous access request by said authorized consumer, wherein said risk analysis (i) determines when the subsequent access request from said consumer to act on behalf of said user should be granted, and (ii) determines when said subsequent access request demonstrates anomalous behavior comprising one or more of abnormal, risky and atypical behavior relative to (a) prior transactions, stored in at least one memory, performed by said consumer on behalf of said user, and (b) said one or more rules, stored in said at least one memory, specified by said user who has granted access to the consumer on behalf of said user;

initiating an investigating by the user when the subsequent access request is denied by the authentication manager and gateway based upon said risk analysis; and prompting said user, by the authentication manager and gateway, based on said risk analysis, to specify whether to allow said subsequent access request by said consumer when said subsequent access request is determined to demonstrate said anomalous behavior;

receiving an updating of the one or more rules by the user based upon the results of the user investigating when the subsequent access request was denied; and validating the updated one or more rules by the authentication manager and gateway.

2. The method of claim 1, wherein said risk analysis determines if said subsequent access request complies with said one or more rules from said user.

3. The method of claim 1, further comprising the step of prompting said user to specify whether to allow future transactions that are similar to said subsequent access request.

4. The method of claim 1, wherein the service provider comprises one or more of an application, web site or hardware device.

5. The method of claim 1, wherein the authentication request comprises a request for at least a portion of at least one password or other authentication credential associated with the user.

6. The method of claim 1, further comprising the step of learning typical access patterns of said consumer.

7. The method of claim 1, wherein said one or more rules from said user specifying said one or more permissions of the consumer comprise permissions of the consumer to act on behalf of said user.

8. An apparatus for controlling access by a consumer to a service provider on behalf of a user, the apparatus comprising:

a memory; and at least one processing device, coupled to the memory, operative to implement the following steps:

obtaining by an authentication manager and gateway one or more rules from said user specifying one or more permissions of the consumer;

issuing an authentication request responsive to an initial access request from the consumer to access the service provider on behalf of the user in accordance with a server-to-server protocol;

providing an access token to the consumer upon approval from the user to grant access to the consumer on behalf of said user, wherein said access token authorizes the consumer to act on behalf of said user until said access token is revoked;

enabling said consumer to use said access token for initial access to the service provider on behalf of the user;

receiving, using at least one processing device of the authentication manager and gateway, a subsequent access request from the consumer with said access token to access the service provider on behalf of the user, wherein the subsequent access request is subsequent to said initial access to the service provider;

performing a risk analysis, using at least one processing device of the authentication manager and gateway, in response to receiving from said consumer said subsequent access request with said access token authorizing the consumer to act on behalf of said user when said access token has not been revoked, to improve security by detecting an anomalous access request by said authorized consumer, wherein said risk analysis (i) determines when the subsequent access request from said consumer to act on behalf of said user should be granted, and (ii) determines when said subsequent access request demonstrates anomalous behavior comprising one or more of abnormal, risky and atypical behavior relative to (a) prior transactions, stored in at least one memory, performed by said consumer on behalf of said user, and (b) said one or more rules, stored in said at least one memory, specified by said user who has granted access to the consumer on behalf of said user;

initiating an investigating by the user when the subsequent access request is denied by the authentication manager and gateway based upon said risk analysis; and prompting said user, by the authentication manager and gateway, based on said risk analysis, to specify whether to allow said subsequent access request by said consumer when said subsequent access request is determined to demonstrate said anomalous behavior;

receiving an updating of the one or more rules by the user based upon the results of the user investigating when the subsequent access request was denied; and validating the updated one or more rules by the authentication manager and gateway.

9. The apparatus of claim 8, wherein said risk analysis determines if said subsequent access request complies with said one or more rules from said user.

10. The apparatus of claim 8, wherein said at least one processing device is further configured to prompt said user to specify whether to allow future transactions that are similar to said subsequent access request.

11. The apparatus of claim 8, wherein the service provider comprises one or more of an application, web site or hardware device.

12. The apparatus of claim 8, wherein the authentication request comprises a request for at least a portion of at least one password or other authentication credential associated with the user.

13. The apparatus of claim 8, wherein said one or more rules from said user specifying said one or more permissions of the consumer comprise permissions of the consumer to act on behalf of said user.

14. An article of manufacture for controlling access by a consumer to a service provider on behalf of a user, comprising a non-transitory machine readable recordable medium containing one or more programs which when executed implement the steps of:

obtaining by an authentication manager and gateway one or more rules from said user specifying one or more permissions of the consumer;

issuing an authentication request responsive to an initial access request from the consumer to access the service provider on behalf of the user in accordance with a server-to-server protocol;

providing an access token to the consumer upon approval from the user to grant access to the consumer on behalf of said user, wherein said access token authorizes the consumer to act on behalf of said user until said access token is revoked;

enabling said consumer to use said access token for initial access to the service provider on behalf of the user;

receiving, using at least one processing device of the authentication manager and gateway a subsequent access request from the consumer with said access token to access the service provider on behalf of the user, wherein the subsequent access request is subsequent to said initial access to the service provider;

performing a risk analysis, using at least one processing device of the authentication manager and gateway, in response to receiving from said consumer said subsequent access request with said access token authorizing the consumer to act on behalf of said user when said access token has not been revoked, to improve security by detecting an anomalous access request by said authorized consumer, wherein said risk analysis (i) determines when the subsequent access request from said consumer to act on behalf of said user should be granted, and (ii) determines when said subsequent access request demonstrates anomalous behavior comprising one or more of abnormal, risky and atypical behavior relative to (a) prior transactions, stored in at least one memory, performed by said consumer on behalf of said user, and (b) said one or more rules, stored in said at least one memory, specified by said user who has granted access to the consumer on behalf of said user;

initiating an investigating by the user when the subsequent access request is denied by the authentication manager and gateway based upon said risk analysis; and prompting said user, by the authentication manager and gateway, based on said risk analysis, to specify whether to allow said subsequent access request by said consumer when said subsequent access request is determined to demonstrate said anomalous behavior;

receiving an updating of the one or more rules by the user based upon the results of the user investigating when the subsequent access request was denied; and validating the updated one or more rules by the authentication manager and gateway.

15. The article of manufacture of claim 14, wherein said risk analysis determines if said subsequent access request complies with said one or more rules from said user.

16. The article of manufacture of claim 14, wherein the service provider comprises one or more of an application, web site or hardware device.

17. The article of manufacture of claim 14, wherein the authentication request comprises a request for at least a portion of at least one password or other authentication credential associated with the user.

18. The article of manufacture of claim 14, further comprising the step of prompting said user to specify whether to allow future transactions that are similar to said subsequent access request.

19. The article of manufacture of claim 14, further comprising the step of learning typical access patterns of said consumer.

20. The article of manufacture of claim 14, wherein said one or more rules from said user specifying said one or more permissions of the consumer comprise permissions of the consumer to act on behalf of said user.

* * * * *